UNITED STATES PATENT OFFICE.

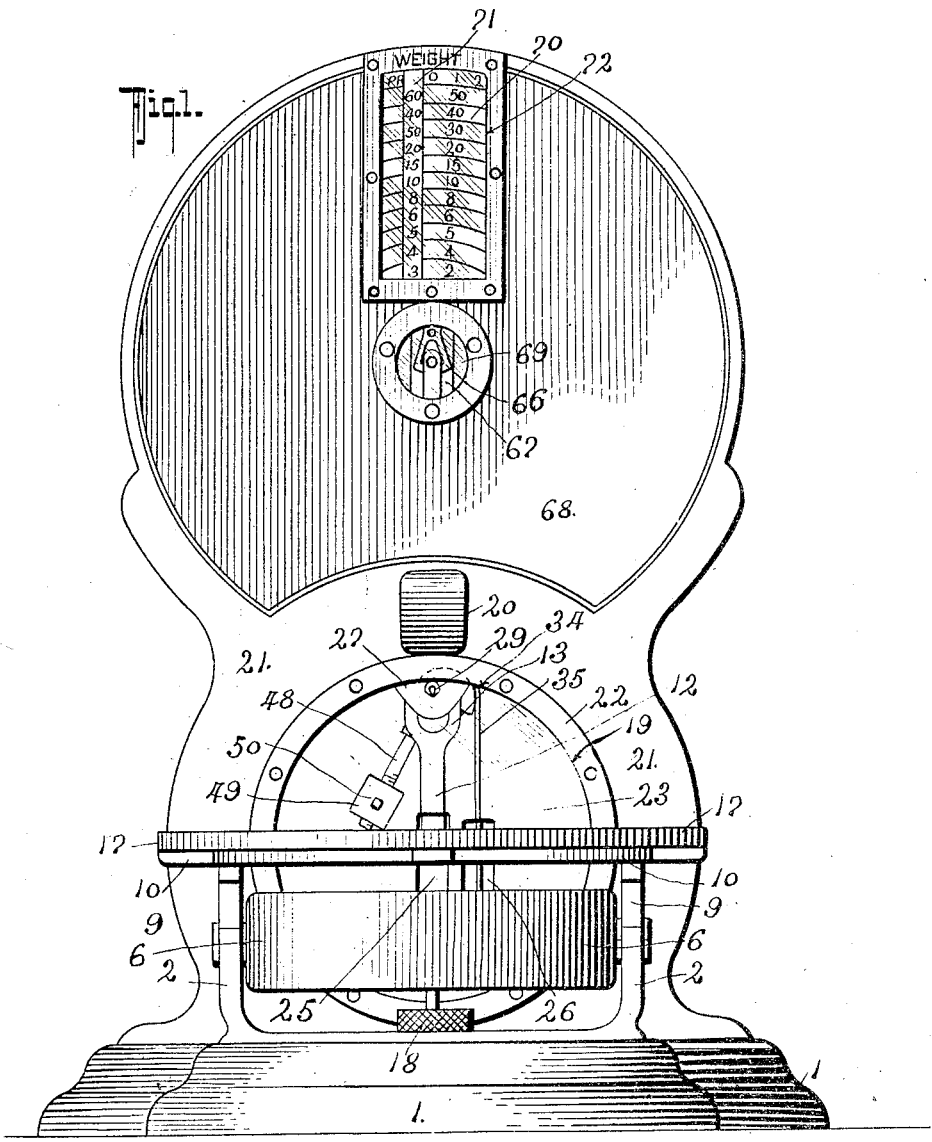

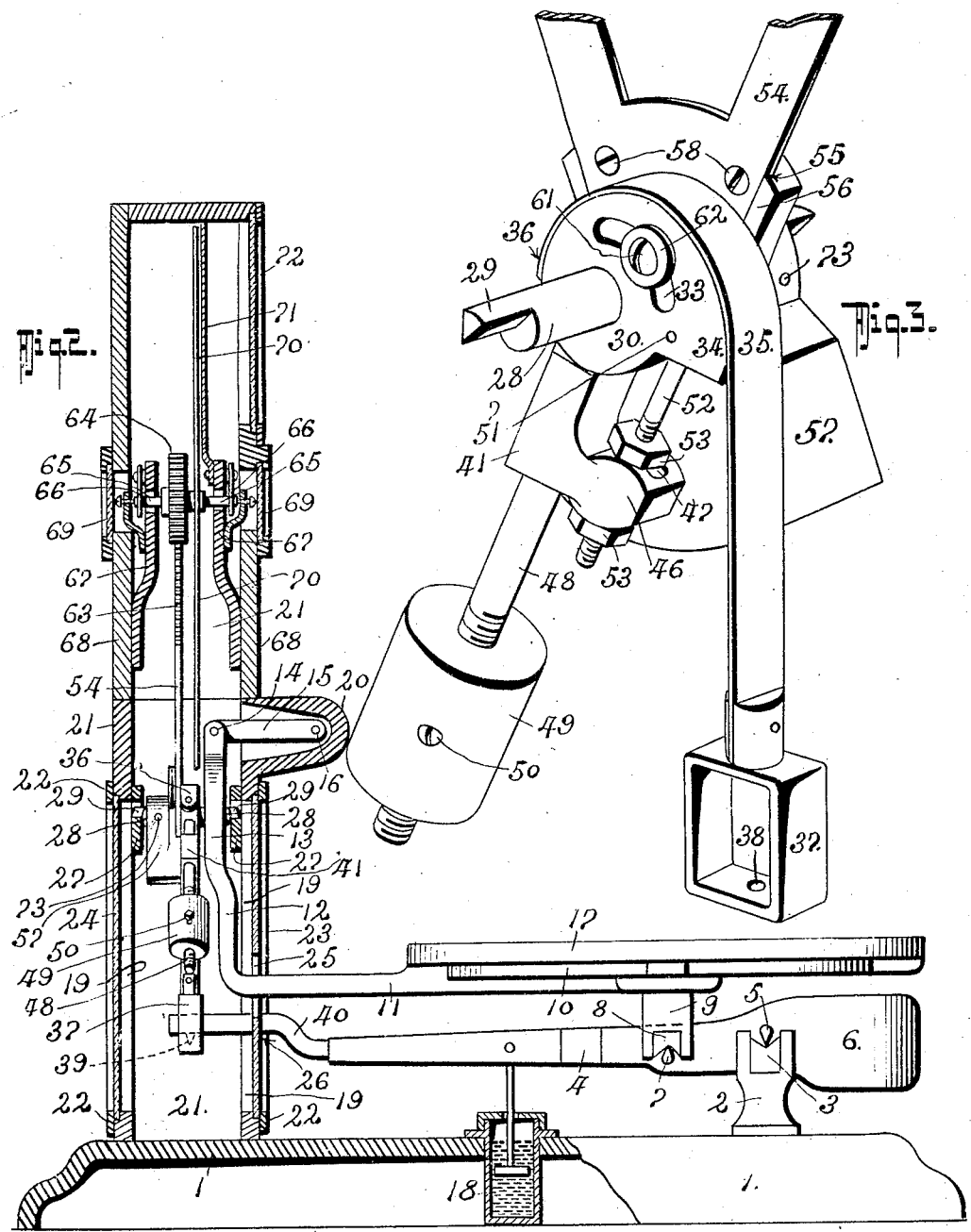

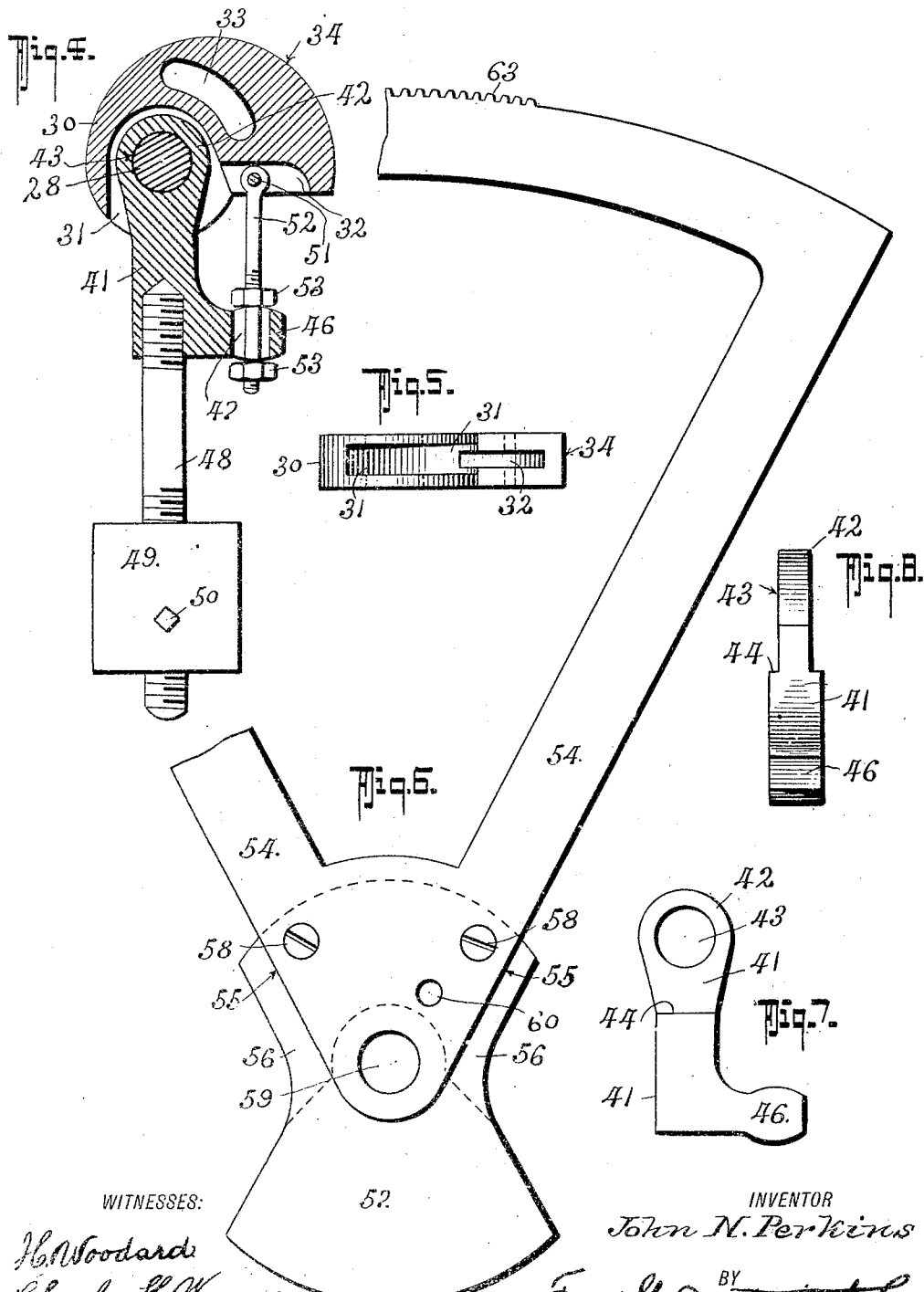

JOHN NICHOLAS PERKINS, OF RICHMOND, VIRGINIA, ASSIGNOR TO RICHMOND SCALE CO., INCORPORATED, OF RICHMOND, VIRGINIA.

COMPUTING-SCALE.

1,004,189.

Specification of Letters Patent. Patented Sept. 26, 1911.

Application filed March 3, 1911. Serial No. 612,051.

*To all whom it may concern:*

Be it known that I, JOHN N. PERKINS, of Richmond, in the county of Henrico and State of Virginia, have invented a certain new and useful Computing-Scale, of which the following is a specification.

My invention is an improved computing scale of the pendulum type, and in its general nature the invention has for its object to provide a scale of a simple and effective construction wherein the necessary adjustment of parts may be made to render the scale accurate and sensitive in its operation, and it further includes an improved construction of equalizing device for the receiver, whereby the receiver may be located as closely as practicable to the counter or support on which the scale may be placed.

In carrying out my invention, I provide a pivotally mounted scale beam, one end of which is counterweighted and the other end of which is connected with the pendulum balancing mechanism; the receiver is pivoted to the beam, and in the preferred construction of the invention, carries what I term an upper back bar which projects up above the plane of the receiver and connects with a pivoted link within the vertical housing of the scale.

The invention further includes a cam mounted to turn on the cam pivot, which pivot is mounted in suitable bearings in the vertical housing that is supported on the scale supporting base. A counterbalanced gear segment is pinned to the pivot shaft and adjustably connected with the cam, while a pendulum is also pivoted on the cam pivot shaft and projects into the cam to which it is adjustably connected so that the cam and pendulum form, as it were, a rigid structure after the necessary adjustments have been made. A strap passes around the cam and carries a stirrup in which one end of the scale beam rests. The movement of the gear segment is imparted through a pinion to a rotary chart which carries suitable computations and coöperates with a fixed indicator bar which is also supplied with suitable computations, both the bar and the indicator being visible through a transparent portion of the casing.

The invention furthermore includes those novel features of construction, combination and arrangement of parts, all of which will be first fully described, and then be specifically pointed out in the appended claims, reference being had to the accompanying drawings, in which:—

Figure 1 is an end elevation of the invention from the receiver end. Fig. 2 is a central vertical longitudinal section and part elevation of the invention. Fig. 3 is a full size detail perspective view of the pendulum pivot shaft and the parts mounted thereon. Fig. 4 is a full size central vertical section of the cam, the cam pivot and the pendulum, showing their relative connections. Fig. 5 is a bottom view of the cam. Fig. 6 is an elevation of the gear segment and its counterbalance, a part of the gear segment being broken away. Fig. 7 is a front elevation, and Fig. 8 is a side elevation of the pendulum supporting member.

Referring now to the accompanying drawing, in which like numerals and letters indicate like parts in all of the figures, 1 is the base of the scale on which the beam bearing standards 2 are mounted. The standards 2 have bearing blocks 3 to receive the knife edge bearing trunnions 5 of the scale beam 4. The beam 4 is of the usual type, having a counterweight 6 at one end and an arm 40 at the other end that projects into the vertical housing 21 in which the pendulum, counterbalance and indicating scale, chart, etc., are mounted. The beam 4 has bearing members 7 on which the blocks 8 of the receiver standards 9 rest. The receiver includes the supporting frame 10 on which the receiver platform (usually a glass plate) 17 is mounted. It is the present practice in the art, to provide an equalizer device for obtaining a movement of the receiver parallel to itself. As at present practice, it is the custom to run a rod vertically downward from the center of the frame itself, into the base 1 where it pivotally connects with a pivoted link, the distance between the pivots of which is equal to the distance between the knife edges 7 and 5. By this construction it is necessary to elevate the base 1 considerably in order to obtain the proper range of movement, thus throwing the receiver 17 a considerable distance above the counter. This is an objectionable feature which I have overcome by the preferred construction of my invention. My improved equalizer consists of a bar 11 that projects into the housing 21 from the frame 10, and is then projected upwardly as at 12, and is pivoted at 14 to a link 15 which is pivoted at 16 in the projection 20 of the housing 21, the distance between the pivots 14 and 16 being substantially equal to that between the pivots 5 and 7. If the bar 10 is run centrally to lie in the central longitudinal plane of the apparatus, it may be slotted at 13 to permit passage of the cam pivot shaft 28.

In order to reduce vibration and cause the indicator chart 70 to come to "rest" promptly, a suitable dash pot 18 may be provided and connected with the beam 4. The housing or casing 21 may be provided with openings 19 which may be covered by transparent members 23 and 24 respectively, the transparent members being held in place by rings 22 or in any other suitable manner. The transparent member 23 is slotted at 25 to permit passage of the arm 11, and is also slotted at 26 to permit passage of the beam finger 40.

27 designates suitable bearing members in the housing 21 in which the bearing ends 29 of the cam and pendulum pivot 28 are mounted. The bearing ends 29 of the pivot 28 may be of any approved type, and although I have disclosed knife edge bearings 29, I do not desire to be limited thereto.

30 designates the cam which is loosely mounted on the shaft 28 and is chambered at 31 to receive the projecting end 42 of the pendulum carrier 41. The cam 30 includes the eccentric portion 34 around which the strap 35 passes, and to which at 36 the end of the strap is fastened. The cam 30 is also chambered at 32 to receive the eye of an eye bolt 52 which is pivoted in the chamber on a pin 51. The eye bolt projects through a slot 47 in the lug or projection 46 of the pendulum carrier 41, and is rigidly secured thereto by nuts 53 or their equivalents. The pendulum carrier 41 is bored and tapped to receive the pendulum rod 48 on which the weight 49 is adjustably mounted and secured by a suitable set screw 50. The strap 35 has its free end connected to a stirrup 37 which has a depression 38 to receive the bearing point 39 of the finger 40.

54 designates the gear segment which is inserted at 55 into the wing 56 of the counterweight 57, the segment 54 being secured in such recess by screws 58 or other suitable devices. The weight 57 and segment 54 are bored at 59 (see Fig. 6) to receive the shaft 28 to which the counterweight 57 is secured in any desired manner, as by a pin 73 (see Figs. 2 and 3).

The cam 30 is adjustably secured to the gear segment 54 and the wing 56 of its counterweight by a suitable connection, such as is disclosed best in Fig. 3 of the drawings by reference to which it will be observed the cam 30 is provided with a concentric slot 33 through which a screw 61 passes. The screw 61 threads into a hole 60 (see Fig. 6) in the segment 54 and wing 56, and carries a washer 62 as indicated. By loosening the screw 61 the cam 30 may be turned on the shaft 28, and by tightening the screw 61 it may be rigidly held to the wing 56 and gear segment and thereby immovably held on the shaft 28. The gear segment 54 has teeth 63 which mesh with a pinion 64 on the chart shaft 65 that is mounted in suitable bearings 66 on shafts 67 carried by the upper section 68 of the vertical housing. The bearings for the shaft 65 may be of any approved construction, but I prefer to use bearings of the type disclosed in my copending application, filed February 13, 1910, Ser. No. 608,253. The upper section 68 of the housing may have transparencies 69, whereby a view of the bearings 66 may be had so that the user may detect any inaccuracy therein.

70 is the indicator chart, a part of which is visible through the transparent portion 72 of the casing 68, the chart 70 carrying suitable computations of the usual type.

71 is the fixed indicator bar that coöperates with the chart or scale dial 70, and is also suitably graduated in a manner well known in the art.

In setting up the scale and adjusting the parts, the gear segment 54 and its counterweight 57 are secured to the shaft 28 and the weight 57 is cut down or added to in the well known manner, until it exactly counterbalances the gear segment 54. The cam 30 is adjusted to its proper position with relation to the gear segment 54 and the pendulum carrier 41 is adjusted to its proper position with relation to the cam 30 in a manner that will be readily apparent to those skilled in the art. In scales of this type, one of the principal difficulties met with in practice is the adjustment of parts so that the scale will weigh accurately and sensitively and also permit a uniform graduation of the chart or dial 70.

It will be seen that with my construction, the adjustments can be readily and accurately effected and in a comparatively short space of time. It will also be observed that the parts are so constructed as to embody a maximum strength without undue cumbersomeness, and furthermore, should it become necessary to replace any of the parts, such replacement may be effected without great expense or loss of time.

From the foregoing description taken in connection with the accompanying drawings, it is thought that the complete construction, operation and advantages of the invention will be readily understood by those skilled in the art to which the invention relates, and I desire it understood that changes in the design and details of construction of the parts may readily be made without departing from the invention.

What I claim is:—

1. In a scale, the combination with a cam pivot, of a cam mounted thereon and having an internal chamber, a pendulum mounted on said pivot and projecting into said cam chamber, a strap secured to said cam and passing around the same and then vertically downward, a beam mounted on a fulcrum, connections between said beam and said strap, a pan or platform mounted on said beam, an arm mounted on said cam pivot and secured thereto, and a rotary scale operated by the movement of said arm, and means for connecting said cam to said arm, and means for connecting said pendulum and cam to move together.

2. In a computing scale, a pivoted shaft, a cam loosely mounted on said shaft, an arm fixedly mounted on said shaft, means for securing said cam to said arm, a pivoted scale beam, a strap having one end secured to said cam and passing around said cam and connected with said beam, a pendulum pivoted on said shaft and adjustably connected with said cam, and a pan or receiver mounted on said beam, and a scale chart operated by said arm.

3. In a computing scale, a pivoted beam, a pivoted shaft, a pendulum counterbalancing device on said shaft and connected with said beam, a rotary scale, a gear segment on said shaft, and coöperative connections between said scale and said gear segment, a receiver pivoted on said beam, a link pivoted in a plane above said receiver, said receiver having an arm projecting up to and pivotally connected with said link.

4. In a scale, a pivoted scale beam, a shaft pivoted in a plane above the beam pivot, a gear segment secured to said shaft, a chart having a rotatable shaft, gear connections between said chart shaft and said gear segment, a pendulum counterbalancing device on said first mentioned shaft, connections between said device and said scale beam, a receiver pivoted on said scale beam, and located in a plane below said first mentioned shaft, a link pivotally mounted in a plane above said first mentioned shaft, and an arm carried by said receiver and projecting upwardly past said first mentioned shaft and pivotally connected to said link.

5. In a computing scale, a computing table or chart, a scale beam, combined with a pendulous counterbalance and chart operating device, said device including a pivoted cam shaft, a gear segment fixed on said shaft and connection between said gear segment and said chart to operate same, a cam loosely mounted on said shaft, said cam having a pocket, a pendulum including a member projecting into said pocket and loosely mounted on said shaft, and adjustable connections between said member and said cam, whereby said cam and said member may be caused to move together, and a strap having one end secured to said cam, passing over the same and connected with said beam.

6. In a computing scale, a computing table or chart, a scale beam, combined with a pendulous counterbalance and chart operating device, said device including a pivoted cam shaft, a gear segment fixed on said shaft and connection between said gear segment and said chart to operate the same, a cam loosely mounted on said shaft, said cam having a pocket, a pendulum including a member projecting into said pocket and loosely mounted on said shaft, and adjustable connections between said member and said cam, whereby said cam and said member may be caused to move together, a strap having one end secured to said cam, passing over the same and connected with said beam; a receiver pivoted on said beam and having an arm projected in the direction of the beam and then upwardly past said cam shaft, and a pivoted link pivotally connected to the other end of said arm to cause said receiver to maintain a horizontal position.

7. In a scale, the combination with a scale beam and a rotary chart and its shaft, of a pivotally mounted cam shaft, a counterbalanced gear segment fixed to said cam shaft, operative connections between said gear segment and said chart shaft, a cam loosely mounted on said cam shaft and adjustably connected to said gear segment, said cam having an internal chamber, a pendulum carrier having a portion projecting into said chamber and loosely mounted on said cam shaft, said pendulum carrier having a projection, a bolt pivoted to said cam and passing through said projection, and means for rigidly securing said bolt to said projection, a rod mounted on said pendulum carrier and a weight mounted on said rod, thereby forming a pendulum in connection with said carrier, and a strap passing around said cam and having one end secured thereto and having its other end secured to said beam.

8. In a scale, the combination with a cam pivot, of a cam loosely mounted to turn thereon, a pendulum loosely mounted on said pivot to turn thereon, and interengaging said cam, a strap secured to said cam and passing around the same and then downwardly, a beam mounted on a fulcrum, connections between said beam and said strap, a pan or platform mounted on said beam, an arm mounted on said cam pivot and relatively fixedly secured thereto, a rotary scale operated by the movement of said arm, and means for adjustably connecting said cam to said arm, and means for adjustably connecting said pendulum to said cam.

JOHN NICHOLAS PERKINS.

Witnesses:
J. C. KENT,
ROBT. N. POLLARD.